United States Patent Office 3,072,679
Patented Jan. 8, 1963

3,072,679
3,4-EPOXY-1-HYDROXYACETAL-CYCLOHEXANES AND ENDOMETHYLENE CYCLOHEXANES
Hans Batzer, Arlesheim, Otto Ernst, Pfeffingen, and Willy Fatzer, Bottmingen, Switzerland, assignors to Ciba Limited, Basel, Switzerland, a company of Switzerland
No Drawing. Filed Oct. 21, 1960, Ser. No. 63,955
Claims priority, application Switzerland Oct. 23, 1959
3 Claims. (Cl. 260—340.7)

The present invention provides new monoepoxides of the formula

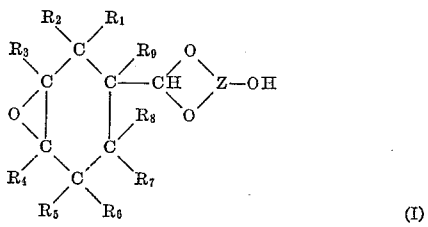

(I)

in which $R_1$ to $R_9$ each represents a monovalent substituent such as a halogen atom, an alkoxy group or an aliphatic, cycloaliphatic, araliphatic or aromatic hydrocarbon radical, preferably an alkyl radical with 1 to 4 carbon atoms or a hydrogen atom, where $R_1$ and $R_5$ together may also represent a divalent substituent such as a methylene group, and Z represents the hydrocarbon radical of a trihydric alcohol.

The monoepoxides (I) of the invention are obtained when a simply unsaturated acetal of the general formula

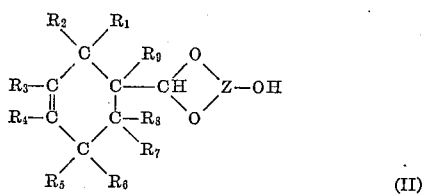

(II)

—in which $R_1$ to $R_9$ and Z have the same meanings as in the Formula I—is treated with an epoxidizing agent.

The starting materials of the Formula II can be obtained, for example, by acetalizing an aldehyde of the formula

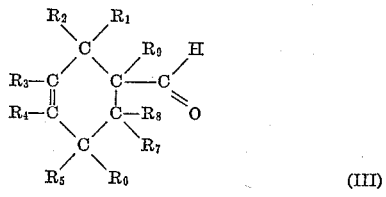

(III)

with a triol of the formula

(IV)

The aldehydes (III) are derivatives of tetrahydrobenzene; there may be mentioned, for example, $\Delta^3$-tetrahydrobenzaldehyde, 6-methyl-$\Delta^3$-tetrahydrobenzaldehyde, 2-methyl-$\Delta^3$-tetrahydrobenzaldehyde, 4-methyl-$\Delta^3$-tetrahydrobenzaldehyde, 4 - chloro - $\Delta^3$ - tetrahydrobenzaldehyde and 2:5-endomethylene-$\Delta^3$-tetrahydrobenzaldehyde.

Suitable triols of the Formula IV are, for example: Glycerol, trimethylolethane, trimethylolpropane, 1:2:4-butanetriol and hexanetriol.

The acetalization can follow the usual procedure and consist, for example, in heating an aldehyde (III) with a triol (IV) in the presence of an acid catalyst such, for example, as sulfuric acid, phosphoric acid or paratoluene-sulfonic acid.

Furthermore, 1 molecular proportion of an aldehyde (III) may be added on to 1 molecular proportion of an epoxide of the formula

(V)

In the present process an acetal (II) is treated with an epoxidizing agent.

The epoxidation of the carbon-to-carbon double bond to form the epoxide group in the compounds of the invention is carried out by a conventional method, preferably with the aid of an organic peracid such as peracetic, perbenzoic, peradipic, monoperphthalic acid or the like. Another suitable epoxidizing agent is hypochlorous acid, in which case in a first stage HOCl is added on to the double bond and in a second stage the epoxide group is formed by treatment with an agent capable of splitting off hydrogen chloride, for example a strong alkali.

The epoxidation may furnish, in addition to the monoepoxides, simultaneously also hydrolyzed epoxides resulting from side reactions, that is to say compounds in which the epoxide group of the monoepoxide (I) has been hydrolyzed to hydroxyl groups.

It has been observed that the presence of such by-products has as a rule an advantageous effect on the technical properties of the cured epoxides, and it is therefore in general of advantage not to isolate the pure monoepoxides from the reaction mixture.

Particularly readily accessible are, for example, the monepoxides of the formula

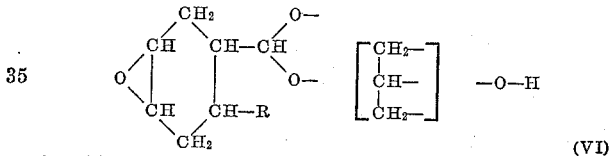

(VI)

in which R represents a hydrogen atom or a lower alkyl radical.

In general, the monoepoxides of the invention constitute at room temperature clear liquids of low viscosity. Unexpectedly, and in contradistinction to known monoepoxides such as butyl glycide, cresyl glycide, styrene oxide and the like, they can be crosslinked or cured by addition of a conventional curing agent for epoxy resins in a manner similar to polyepoxide compounds.

As such curing agents either basic or more especially acidic compounds may be used: Amines or amides, such as aliphatic and aromatic primary, secondary and tertiary amines, for example mono-, di- and tributylamines, paraphenylenediamine, bis-[para-aminophenyl]-methane, ethylenediamine, N:N-diethyl-ethylenediamine, diethylenetriamine, tetra-[hydroxyethyl]-diethylenetriamine, triethylenetetramine, tetraethylenepentamine, N:N-dimethyl-propylenediamine, trimethylamine, diethylamine, triethanolamine, Mannich's bases, piperidine, piperazine, guanidine and guanidine derivatives such as phenyldiguanidine, diphenylguanidine, dicyandiamide, aniline-formaldehyde resins, urea-formaldehyde resins, melamine-formaldehyde resins, polymers of aminostyrenes, polyamides, for example those obtained by reacting aliphatic polyamines with dimerized or trimerized unsaturated fatty acids, isocyanates, isothiocyanates; polyhydric phenols, for example resorcinol, hydroquinone, bis-[4-hydroxyphenyl]-dimethylmethane, quinone, phenol-aldehyde resins, oil-modified phenol-aldehyde resins, reaction products of aluminum alcoholates or phenolates with compounds of tautomeric reaction of the type of acetoacetic esters, Friedel-Crafts catalysts, such as aluminum chloride, antimony pentachloride, tin tetrachloride, zinc chloride or boron trifluoride or complexes thereof with organic compounds;

metal fluoborates, boroxines, or phosphoric acid. Preferred use is made as curing agents of polybasic carboxylic acids and anhydrides thereof, for example phthalic anhydride, methylendomethylene tetrahydrophthalic anhydride, dodecenyl-succinic anhydride, tetrahydrophthalic anhydride, hexahydrophthalic anhydride, hexachloroendomethylene tetrahydrophthalic anhydride or endomethylene tetrahydrophthalic anhydride, or mixtures of said anhydrides; maleic or succinic anhydride. If desired, there may be further added an accelerator, such as a tertiary amine or a strong Lewis base, for example an alkali metal alcoholate, and advantageously also polyhydroxy compounds, such as hexanetriol, or glycerol.

It has been found that when curing a monoepoxide of the invention with a carboxylic acid anhydride it is of advantage to use for every gram equivalent of epoxide group 0.2 to 1.1 gram equivalents of anhydride groups. When basic accelerators, such as alkali metal alcoholates or alkali metal salts of carboxylic acids are used, up to 1.5 gram equivalents of anhydride groups may be used.

The term "curing" as used in this context signifies the conversion of the above mentioned epoxide compounds into insoluble and infusible resins.

The monoepoxides of the invention are above all used together with curable polyepoxides or epoxy resins, more especially as active diluents. The addition of a so-called active diluent is often desirable in casting or laminating resins or solvent-free lacquers to produce curable resin mixtures of as low a viscosity as possible that are liquid at room temperature. All known active diluents for epoxy resins such, for example, as cresyl glycide, have the serious shortcoming that they have an extremely unfavourable effect on the mechanical thermal stability according to Martens of the cured resins. Most unexpectedly, it has now been observed that the monoepoxides of the invention constitute excellent active diluents by virtue of their low viscosity and, moreover, they even enhance the mechanical thermal stability of the cured resin mixtures as a rule, or at least they reduce it at worst only negligibly.

As examples of diepoxide and polyepoxide compounds preferably used together with the monoepoxides of the invention there may be mentioned: Epoxidized diolefines, dienes or cyclic dienes such as butadiene dioxide, vinyl cyclohexene dioxide, 1:2:5:6-diepoxyhexane and 1:2:4:5-diepoxycyclohexane; epoxidized diolefinically unsaturated carboxylic acid esters, such as methyl-9:10:12:13-diepoxy-stearate; the dimethyl ester of 6:7:10:11-diepoxy-hexadecane-1:16-dicarboxylic acid; epoxidized compounds containing two cyclohexenyl groups, such as bis-[3:4-epoxy-cyclohexylmethyl]-succinate, bis-[3:4-epoxy-cyclohexylmethyl]-phthalate, diethyleneglycol-bis-[3:4-epoxy-cyclohexanecarboxylate], 3:4 - epoxy - cyclohexylmethyl-methylcyclohexylmethyl - 3:4 - epoxy - 6 - methyl-cyclohexane-carboxylate. Furthermore basic polyepoxides such as are obtained by dehydrohalogenating reaction products of primary or secondary amines, such as n-butylamine, aniline or 4:4'-di-[monomethylamino]-diphenylmethane, with epichlorohydrin. Further suitable are polyglycidyl esters such as are obtained by reacting a dicarboxylic acid with epichlorohydrin or dichlorohydrin in the presence of alkali. Such polyesters may be derived from aliphatic dicarboxylic acids such as oxalic, succinic, glutaric, adipic, pimelic, suberic, azelaic, sebacic acid and more especially of aromatic dicarboxylic acids such as phthalic, isophthalic, terephthalic, 2:6-naphthalene-dicarboxylic acid, diphenyl-ortho:ortho'-dicarboxylic acid, or ethylene glycol-bis-(para-carboxyphenyl)-ether and the like. There may be mentioned, for example, diglycidyl adipate and diglycidyl phthalate, as well as diglycidylesters of the average formula $$CH_2—CH—CH_2—(OOC—X—COO—CH_2—CHOH—CH_2—)_z—$$
$$\diagdown O \diagup$$

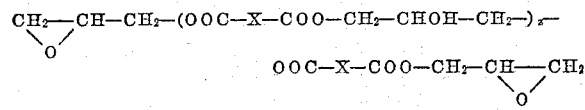

in which X represents an aromatic hydrocarbon radical, such as a phenylene radical, and z is a small integer or fraction included, for example, between 0 and 2.

Further suitable are polyglycidyl ethers such as are obtained by etherifying a polyhydric alcohol or polyphenol with epichlorohydrin or dichlorohydrin in the presence of alkali. These compounds may be derived from glycols, such as ethylene glycol, diethylene glycol, triethylene glycol, 1:2-propanediol, 1:3-propanediol, 1:4-butanediol, 1:5-pentanediol, 1:6-hexanediol, 2:4:6-hexanetriol, glycerol or from polyphenols such as phenol and cresol novolaks, resorcinol, pyrocatechol, hydroquinone, 1:4-dihydroxynaphthalene, bis-[-4-hydroxyphenyl]-methane, bis-[4 - hydroxyphenyl] - methylphenylmethane, bis - [4 - hydroxyphenyl]-tolylmethane, 4:4'-dihydroxydiphenyl, bis-[hydroxyphenyl]-sulfone and above all 2:2-bis-[4-hydroxyphenyl]-propane (bisphenol). There may be mentioned ethylene glycol diglycidyl ethers and resorcinol diglycidyl ethers, as well as diglycidyl ethers of the average formula $$CH_2—CH—CH_2—[—O—X—O—CH_2CHOH—CH_2]_z—$$
$$\diagdown O \diagup$$

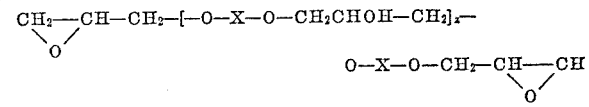

in which X represents an aromatic hydrocarbon radical, such as the phenylene radical, or the hydrocarbon radical of bisphenol, and z represents a small integer or fraction included, for example, between 0 and 2.

Accordingly, the present invention further provides curable mixtures containing a monoepoxide of the invention, preferably together with a diepoxide or polyepoxide, as well as a curing agent for epoxy resins, preferably an anhydride of a dicarboxylic or polycarboxylic acid.

The monoepoxides of the invention and their mixtures with polyepoxides and/or curing agents may further be mixed, at any stage prior to the curing operation, with fillers, plasticisers, coloring matter or the like. Suitable extenders and fillers are, for example, asphalt, bitumen, glass fibers, mica, quartz meal, cellulose, kaolin, finely distributed silicic acid (Aerosil) or metal powders.

The mixtures containing in addition to a monoepoxide of the invention a polyepoxide and/or a curing agent can be used without or with a filler, if desired in the form of a solution or emulsion, as textile assistants, laminating resins, paints, lacquers, dipping resins, casting resins, coating compositions, pore fillers, putties, adhesives, moulding compositions and the like, as well as for the manufacture of such substances. The new resins are of special importance when used as insulating compounds for electrical purposes.

In the following examples parts and percentages are by weight and the relationship between parts by weight and parts by volume is the same as that between the kilogram and the liter. The indicated values "epoxide equivalents per kg." have been determined by the method described by A. J. Durbetaki in "Analytical Chemistry," volume 28, No. 12, December 1956, pages 2000–2001, with hydrogen bromide in glacial acetic acid.

EXAMPLE 1

(A) *Acetal From Δ³-tetrahydrobenzaldehyde and Glycerol*

A mixture of 660 parts (6 molecular proportions) of Δ³-tetrahydrobenzaldehyde, 552 parts (6 molecular proportions) of glycerol, 12 parts of para-toluenesulfonic acid and 1300 parts of benzene is boiled in a circulation distillation apparatus (see the article by H. Batzer and co-workers in "Die Makromolekulare Chemie," No. 7 [1951], page 84–85), for 35 hours at an oil bath temperature of about 120° C. The drying agent applied to the benzene refluxing into the reaction vessel is soda lime. On completion of the reaction the benzene solution is shaken with 70 parts by volume of a saturated aqueous sodium carbonate solution and then with 100 parts by volume of water. The aqueous phase is separated and the benzene solution dried with anhydrous sodium sulfate. The benzene is distilled off under diminished pressure at a water bath temperature of about 50° C. Without using a fractionating column, the acetal passes over at 96–102° C. under a pressure of 0.3 to 0.4 mm. Hg. Yield: 800 parts of acetal. On being subjecting to fractional distillation the acetal passes over at 74–75° C. under a pressure of 0.05 mm. Hg.

Analysis, $C_{10}H_{16}O_3$:

|  | C | H | O |
|---|---|---|---|
| Calculated, percent | 65.19 | 8.75 | 26.05 |
| Found, percent | 65.13 | 8.75 |  |

(B) *Epoxide of the Acetal From $\Delta^3$-tetrahydrobenzaldehyde and Glycerol*

(a) 736 parts (4 molecular proportions) of the acetal prepared as described in Example 1(A) from $\Delta^3$-tetrahydrobenzaldehyde and glycerol ($\Delta^3$-tetrahydrobenzal glycerol) are purified by fractional distillation and then dissolved in 2400 parts by volume of benzene with stirring at room temperature, and 530 parts of anhydrous sodium carbonate are then suspended in this solution. While cooling with water there are then added dropwise with vigorous stirring to this suspension within about 5 hours 800 parts of peracetic acid of about 42% strength (containing about 46% of free acetic acid, about 3% of hydrogen peroxide, about 10% of water and about 1% of sulfuric acid) at a rate such that the internal temperature is kept at 19 to 25° C. On completion of the dropwise addition the whole is stirred for about 20 hours at 13 to 20° C. while being cooled with water. The suspended salt is filtered off. The salt residue is washed 5 times with 800 parts by volume of benzene on each occasion. The benzene filtrates are combined and stirred for about 12 hours with 424 parts of anhydrous, ground and sieved sodium carbonate at room temperature. The salt is separated and washed 5 times with 250 parts by volume of benzene on each occasion. The benzene is removed from the combined filtrates under reduced pressure at a maximum internal temperature of 40° C. Further amounts of solvent can be removed by heating for 1½ hours at a bath temperature of about 40° C. under a pressure of 0.1 to 0.2 mm. Hg. Yield: 794 parts of a substantially colorless, liquid, unrestrictedly water-soluble product containing 4.7 epoxide equivalents per kg.

To remove any residue of readily volatile constituents the product is heated for about 40 minutes at a bath temperature of about 140° C. under a pressure of about 0.1 mm. Hg. The epoxide content of the product purified in this manner is substantially unchanged. In the following examples it is referred to as "product D."

From the abovementioned product D the pure monoepoxide compound can be obtained by fractional distillation; it distills at 110–115° C. under 0.1 mm. Hg and has an epoxide equivalent of 4.9 (theory: 5.0).

Analysis, $C_{10}H_{16}O_4$, molecular weight 200.23:

|  | C | H |
|---|---|---|
| Calculated, percent | 59.98 | 8.05 |
| Found, percent | 59.92 | 8.10 |

(b) In the epoxidation of tetrahydrobenzal glycerol performed in the following example peracetic acid is replaced by hydrogen peroxide and succinic anhydride.

130 parts of succinic anhydride and 184 parts (1 molecular proportion) of the $\Delta^3$-tetrahydrobenzal glycerol prepared as described in Example 1(A) are dissolved at 41° C. in 1400 parts by volume of ethyl acetate. 21 parts of anhydrous sodium carbonate are then added. During the whole reaction period the reaction vessel is immersed in a heating bath maintained at 44° C. 52 parts of hydrogen peroxide of 85% strength are stirred dropwise within 50 minutes into the mixture which is then stirred for 20 hours more at the temperature mentioned above, so that the succinic acid precipitates. The whole is cooled to 20° C., and the precipitate is filtered off and washed with a small amount of ethyl acetate.

The filtrate is stirred for about 19 hours with 90 parts of anhydrous sodium carbonate.

To complete the neutralization 16 parts by volume of 10 N-sodium hydroxide solution are added after the aforementioned period. The salt is then filtered off and washed with a small amount of ethyl acetate. The filtrate is evaporated under diminished pressure at a bath temperature of 40° C. Any last remnants of volatile constituents are removed within one hour under a pressure of about 0.45 mm. Hg at a bath temperature of 70° C.

There are obtained 193.2 parts of epoxidized acetal (colorless, clear liquid) containing 4.8 epoxide equivalents per kg. Theory: 5.0 epoxide equivalents per kg.

The above monoepoxide (100 parts) can be cured with 50 parts of phthalic anhydride in the presence of 23 parts of 2:4-dihydroxy-3-hydroxymethyl-pentane to form an infusible, hard casting having good mechanical properties.

EXAMPLE 2

(A) *Acetal From 6-Methyl-$\Delta^3$-Tetrahydrobenzaldehyde and Glycerol*

The acetal is prepared as described in Example 1(A), 573 parts (4.62 molecular proportions) of 6-methyl-$\Delta^3$-tetrahydrobenzaldehyde being reacted for 18 hours with 425 parts (4.62 molecular proportions) of glycerol in the presence of 10 parts of para-toluenesulfonic acid in 1200 parts of benzene.

The acetal is distilled without use of a fractionating column at 100–117° C. under a pressure of 0.4–0.6 mm. Hg, to yield 412 parts of the acetal.

(B) *Epoxide of the Acetal From 6-Methyl-$\Delta^3$-Tetrahydrobenzaldehyde and Glycerol*

The epoxide of the acetal from 6-methyl-$\Delta^3$-tetrahydrobenzaldehyde and glycerol is manufactured as described in Example 1(B), using:

369 parts (about 2 molecular proportions) of the acetal from 6-methyl-$\Delta^3$-tetrahydrobenzaldehyde and glycerol prepared as described above, purified by distillation without using a fractionating column, 1200 parts by volume of benzene, 265 parts of sodium carbonate and 400 parts of peracetic acid of about 42% strength. The dropwise addition of the peracetic acid takes about 2½ hours. The benzene filtrates are combined, and stirred for about 12 hours with 212 parts of ground and strained sodium carbonate. After distilling off the benzene, 417 parts of a substantially colorless, viscous liquid containing 3.8 epoxide equivalents per kg. are obtained. After having ing been heated for one hour at a bath temperature of about 140° C. under a pressure of about 0.2 mm. Hg the product still has an epoxide content of 3.7 epoxide equivalents per kg.

EXAMPLE 3

(A) *Acetal From $\Delta^3$-Tetrahydrobenzaldehyde and 1:2:6-Hexanetriol*

The acetal is prepared as described in Example 1(A) by reacting 550 parts (5 molecular proportions) of $\Delta^3$-tetrahydrobenzaldehyde with 670 parts (5 molecular proportions) of 1:2:6-hexanetriol in the presence of 12 parts of paratoluenesulfonic acid in 1300 parts of benzene for 15 hours. The acetal is distilled without use of a fractionating column at 129–136° C. under a pressure of 0.1 to 0.2 mm. Hg, to yield 731 parts of the acetal. On being subjected to fractional distillation under a pressure of 0.08 mm. Hg the acetal distills at 125–126° C.

Analysis, $C_{13}H_{22}O_3$, molecular weight 226.31:

|  | C | H |
|---|---|---|
| Calculated, percent | 68.99 | 9.80 |
| Found, percent | 69.15 | 10.03 |

(B) *Epoxide of Acetal From $\Delta^3$-Tetrahydrobenzaldehyde and 1:2:6-Hexane-Triol*

The epoxide of the acetal from $\Delta^3$-tetrahydrobenzaldehyde and 1:2:6-hexanetriol is prepared as described in Example 1(B) with the use of:

452 parts (about 2 molecular proportions) of the acetal from $\Delta^3$-tetrahydrobenzaldehyde and 1:2:6-hexanetriol prepared as described above, purified by distillation without use of a fractionating column, 1200 parts by volume of benzene, 265 parts of sodium carbonate and 400 parts of peracetic acid of about 42% strength. The dropwise addition of the latter takes about 3 hours. The filtrates are combined and stirred for about 12 hours with 212 parts of ground and strained sodium carbonate. The salt is separated and washed with benzene. After having distilled off the benzene there are obtained 470 parts of a clear, slightly yellowish liquid containing 3.8 epoxide equivalents per kg. After having been heated for about one hour at a bath temperature of about 130° C. under a pressure of about 0.1 mm. Hg the product still contains 3.7 epoxide equivalents per kg.

EXAMPLE 4

(A) *Acetal From $\Delta^3$-Tetrahydrobenzaldehyde and 1:1:1-Trimethylolpropane*

A solution of 880 parts of $\Delta^3$-tetrahydrobenzaldehyde, 1072 parts of 1:1:1-trimethylolpropane and 15 parts of para-toulenesulfonic acid in 1200 parts of benzene is acetalized as described in Example 1. In this manner 132 parts of water have been separated after 5 hours. The whole is cooled, agitated with 20 parts of sodium carbonate, filtered, the benzene is distilled off and the residue is distilled through a Vigreux column. The acetal of the formula

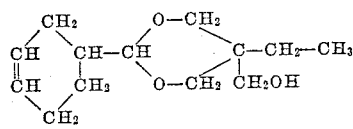

passes over at 115–120° C. under a pressure of 0.18 mm. Hg. Yield: 1437 parts=79% of the theoretical. Hydroxyl number: 244=98.5% of the theoretical.

Analysis, $C_{13}H_{22}O_3$:

|  | C | H | O |
|---|---|---|---|
| Calculated, percent | 68.99 | 9.80 | 21.21 |
| Found, percent | 68.76 | 9.68 |  |

(B) *Epoxide of the Acetal From $\Delta^3$-Tetrahydrobenzaldehyde and 1:1:1-Trimethylolpropane*

The epoxide of the acetal from $\Delta^3$-tetrahydrobenzaldehyde and 1:1:1-trimethylolpropane is prepared as described in Example 1(B) with the use of:

226 parts (1 molecular proportion) of the acetal from $\Delta^3$-tetrahydrobenzaldehyde and 1:1:1-trimethylolpropane, purified by fractional distillation, prepared and purified as described above, 400 parts by volume of benzene, 133 parts of anhydrous sodium carbonate and 200 parts of peracetic acid of about 42% strength. The dropwise addition of the latter takes about 1½ hours.

The combined filtrates are stirred for about 19 hours with 106 parts of anhydrous sodium carbonate. The salt is separated and washed with benzene. Any readily volatile constituents remaining after the benzene has been distilled off are removed by heating for 3 hours at a bath temperature of 70° C. under a pressure of 0.4 mm. Hg. Yield: 226 parts of a clear, colorless liquid (syrup) containing 3.9 epoxide equivalents (theory: 4.13 epoxide equivalents) per kg.

EXAMPLE 5

(A) *Acetal From $\Delta^3$-Tetrahydrobenzaldehyde and 1:2:4-Butanetriol*

A solution of 990 parts of $\Delta^3$-tetrahydrozenzaldehyde, 954 parts of 1:2:4-butanetriol and 15 parts of paratoluensulfonic acid in 1000 parts of benzene is heated with stirring to 120–130° C. The water of reaction formed is distilled off azeotropically with the aid of a circulation distillation apparatus (see article by H. Batzer and co-workers in "Die Makromolekulare Chemie," No. 7 [1951], pages 84–85). In this manner 158 parts of water are separated within about 12 hours. After cooling, the whole is agitated with 20 parts of sodium carbonate and filtered and the benzene is removed under reduced pressure. The dark-brown residue is distilled through a Vigreux column.

The water-clear acetal of the formula

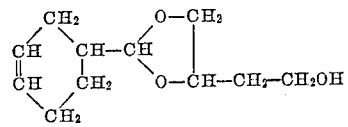

passes over at 116–118° C. under a pressure of 0.2 mm. Hg. Yield: 1036 parts=59% of the theoretical. Hydroxyl number: 293=103% of the theoretical.

Analysis, $C_{11}H_{18}O_3$:

|  | C | H | O |
|---|---|---|---|
| Calculated, percent | 66.64 | 9.15 | 24.21 |
| Found, percent | 66.69 | 9.11 |  |

(B) *Epoxide of the Acetal From $\Delta^3$-Tetrahydrobenzaldehyde and 1:2:4-Butanetriol*

The epoxide of the acetal from $\Delta^3$-tetrahydrobenzaldehyde and 1:2:4-butanetriol is prepared as described in Example 1(B) with the use of:

198 parts (1 molecular proportion) of the acetal from $\Delta^3$-tetrahydrobenzaldehyde and 1:2:4-butanetriol, purified by fractional distillation, prepared and purified as described above, 400 parts by volume of benzene, 133 parts of anhydrous sodium carbonate and 200 parts of peracetic acid of about 42% strength. The dropwise addition of the latter takes about 1¾ hours.

The combined filtrates are stirred for about 22 hours with 106 parts of anhydrous sodium carbonate. The salt is separated and washed with benzene. Any readily volatile constituents remaining after the benzene has been distilled off are removed by heating for 2 hours at a bath temperature of 70° C. under a pressure of 0.3 mm. Hg. Yield: 198.2 parts of a clear, colorless liquid (syrup) containing 4.5 (theory: 4.67) epoxide equivalents per kg.

EXAMPLE 6

(A) *Acetal From 2:5-Endomethylene-$\Delta^3$-Tetrahydrobenzaldehyde and Glycerol*

A mixture of 610 parts (5 molecular proportions) of 2:5-endomethylene - $\Delta^3$ - tetrahydrobenzaldehyde, 465 parts (5 molecular proportions) of glycerol, 2 parts of orthophosphoric acid, 2 parts of anhydrous zince chloride and 750 parts by volume of benzene is boiled in a circulation distillation apparatus [see Example 1(A)] at an oil bath temperature of about 120° C. for 4½ hours, to yield as by-product 91.5 parts by volume (theory: 90 parts by volume) of water.

On completion of the reaction the benzene solution is stirred for about 20 hours with 30 parts of anhydrous sodium carbonate to neutralize the acid catalyst.

The salt is filtered off and the benzene solution is evaporated under reduced pressure at a water-bath temperature of about 50° C.

Any remaining readily volatile constituents are removed by heating for 3 hours at a bath temperature of 70° C. under a pressure of 0.5 mm. Hg. Yield: 971 parts of a clear, dark-brown liquid.

On subsequent fractional distillation under a pressure of 0.05 mm. Hg. the acetal passes over at 90 to 91° C. Yield: 419 parts of a clear, colorless liquid.

Analysis, $C_{11}H_{16}O_3$:

|  | C | H | O |
|---|---|---|---|
| Calculated, percent | 67.32 | 8.22 | 24.46 |
| Found, percent | 67.50 | 8.24 | 24.17 |

(B) *Epoxide of the Acetal From 2:5-Endomethylene-$\Delta^3$-Tetrahydrobenzaldehyde and Glycerol*

The epoxide of the acetal from 2:5-endomethylene-$\Delta^3$-tetrahydrobenzaldehyde and glycerol is prepared as described in Example 1(B) with the use of:

196 parts (1 molecular proportion) of the acetal from 2:5-endomethylene-$\Delta^3$-tetrahydrobenzaldehyde and glycerol, purified by fractional distillation, prepared and purified as described in Example 6(A), 800 parts by volume of benzene, 145.6 parts of anhydrous sodium carbonate and 218.4 parts of peracetic acid of about 42% strength. The dropwise addition of the latter takes about 45 minutes.

The combined filtrates are stirred for about 19 hours with 120 parts of anhydrous sodium carbonate.

The salt is separated and washed with benzene. Any readily volatile constituents remaining after the benzene has been distilled off are removed by heating for 1½ hours at a bath temperature of 57° C. under a pressure of 0.45 mm. Hg. Yield: 200 parts of a clear, colorless liquid (syrup).

Analysis, $C_{11}H_{16}O_4$:

|  | C | H | O |
|---|---|---|---|
| Calculated, percent | 62.25 | 7.60 | 30.15 |
| Found, percent | 61.70 | 7.58 | 30.30 |
|  | 61.39 | 7.59 |  |

EXAMPLE 7

(A) *Acetal From 6-Methyl-$\Delta^3$-Tetrahydrobenzaldehyde and 1:1:1-Trimethylolpropane*

By working as described in Example 6(A) equivalent amounts of aldehyde and triol are condensed. The resulting acetal boils at 119–120° C. under a pressure of 0.2 mm. Hg.

(B) *Epoxide of the Acetal From 6-Methyl-$\Delta^3$-Tetrahydrobenzaldehyde and 1:1:1-Trimethylolpropane*

The epoxide of the acetal from 6-methyl-$\Delta^3$-tetrahydrobenzaldehyde and 1:1:1-trimethylolpropane is prepared as described in Example 1(B) with the use of:

240 parts (1 molecular proportion) of the acetal from 6-methyl-$\Delta^3$-tetrahydrobenzaldehyde and 1:1:1-trimethylolpropane, purified by distillation without a fractionating column, prepared as described above, 400 parts by volume of benzene, 133 parts of anhydrous sodium carbonate and 200 parts of peracetic acid of about 42% strength. The dropwise addition of the latter takes about 2½ hours.

The combined filtrates are stirred for about 17 hours with 106 parts of anhydrous sodium carbonate.

The salt is separated and washed with benzene. Any readily volatile constituents remaining after the benzene has been distilled off are removed by heating for one hour at a bath temperature of 50° C. under a pressure of 0.25 mm. Hg. Yield: 241 parts of a clear, colorless liquid (syrup) containing 3.3 (theory: 3.9) epoxide equivalents per kg.

EXAMPLE 8

Test specimens of a polyglycidyl ether resin which is solid at room temperature, contains 2.55 epoxide equivalents per kg. and has been prepared by reacting epichlorohydrin with bis-[4-hydroxyphenyl]-dimethylmethane in the presence of alkali (resin A), and test specimens of mixtures prepared by dissolving the monoepoxide (product D) prepared as described in Example 1(B), in resin A at about 70° C., are melted with phthalic anhydride as curing agent at 120–125° C., using per equivalent of epoxide groups of resin A, and of the mixture of resin A and product D respectively, 0.85 equivalent of anhydride groups.

A first portion of each mixture is cast at about 120° C. in aluminum moulds (40 x 10 x 140 mm.) and cured for 24 hours at 140° C.

The viscosity of resin A and of the mixture of resin A with product D, as well as the properties of the cured castings are shown in the following table:

| Specimen | Resin A, parts | Product D, parts | Viscosity at 23° C. of resin A and of mixture A+D in cp. | Bending strength, kg./mm.$^2$ | Thermal stability according to Martens DIN in ° C. |
|---|---|---|---|---|---|
| 1 | 100 | 0 | solid | 14.0 | 100 |
| 2 | 80 | 20 | viscid | 14.1 | 95 |
| 3 | 60 | 40 | 150,000 | 15.6 | 100 |

A second portion each of specimens 2 and 3 is poured in the form of a layer about 0.1 mm. thick over glass plates and cured for 24 hours at 140° C. The resulting faultless, hard films are resistant to immersion for one hour at room temperature in 5 N-sulfuric acid, 5 N-sodium hydroxide solution, water, acetone and chlorobenzene.

EXAMPLE 9

1.75 parts each of a sodium alcoholate prepared by dissolving 0.82 part of sodium metal at about 120° C. in 100 parts of 2:4-dihydroxy-3-hydroxymethyl-pentane, are dissolved in 100 parts each of the resin A described in Example 8 and respectively in the mixtures of resin A with product D described in Example 8, at about 70° C. (specimen 1), at 50° (specimen 2) and at room temperature (specimen 3).

The curing agent used is 1.0 equivalent of phthalic anhydride per equivalent of epoxide groups, fused in at 120–125° C. The resulting mixtures are cast at about 120° C. in aluminum moulds and heated for 24 hours at 140° C. as described in Example 8.

The cured castings have the properties shown in the following table:

| Specimen | Resin A, parts | Product D, parts | Bending strength, kg./mm.$^2$ | Thermal stability according to Martens DIN in ° C. |
|---|---|---|---|---|
| 1 | 100 | 0 | 14.3 | 94 |
| 2 | 80 | 20 | 16.0 | 97 |
| 3 | 60 | 40 | 10.2 | 92 |

EXAMPLE 10

A polyglycidyl ether resin which is liquid at room temperature, has a viscosity of 12,000 cp. at 23° C. and contains 5.3 epoxide equivalents per kg., prepared by reacting epichlorohydrin with bis-[4-hydroxyphenyl]-dimethylmethane in the presence of alkali (resin B) is mixed at room temperature in two different ratios with a monoepoxide resin (product D) prepared as described in Example 1(B). These mixtures are melted at 120–130° C.

with phthalic anhydride as curing agent, using in each case 0.85 equivalent of anhydride groups per equivalent of epoxide groups.

A first portion each of the mixtures is cast in aluminum moulds and cured for 24 hours at 140° C. as described in Example 8, whereas a second portion is used for cementing tests. For the latter purpose strips of degreased and polished aluminum marketed under the trade name "Anticorodal B" (170 x 25 x 1.5 mm.; 10 mm. overlap) are cemented together and cured for 24 hours at 120° C.

The viscosity of the mixtures of resin B with product D, as well as the properties of the cured castings and of the cemented strips of aluminum are shown in the following table:

| Specimen | Resin B, parts | Product D, parts | Viscosity of mixture B+D at 23° C. in cp. | Bending strength, kg./mm.² | Thermal stability according to Martens DIN in ° C. | Shear strength, kg./mm.² |
| --- | --- | --- | --- | --- | --- | --- |
| 1 | 90 | 10 | 9,200 | 16.4 | 116 | 1.4 |
| 2 | 70 | 30 | 6,400 | 16.9 | 105 | 1.4 |

EXAMPLE 11

In experiment 1, 1.75 parts of the sodium alcoholate described in Example 9 are dissolved at room temperature or a slightly higher temperature in 100 parts of a cycloaliphatic polyepoxide compound (resin C) of the formula

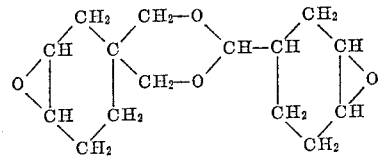

containing 6.28 equivalents of epoxide groups per kg.; in experiment 2 in 100 parts of a mixture of epoxy resins consisting of 80 parts of resin C and 20 parts of a monoepoxide compound prepared as described in Example 1(B); in experiment 3 in 100 parts of a mixture of epoxy resin consisting of 80 parts of resin C and 20 parts of a monoepoxide compound prepared as described in Example 2(B); and in experiment 4 in 100 parts of a mixture of epoxy resins consisting of 80 parts of resin C and 20 parts of a monoepoxide compound prepared as described in Example 3(B).

In each case 1.0 equivalent of phthalic anhydride per equivalent of epoxide groups is fused in as curing agent at 120–125° C. Each mixture obtained in this manner is poured in aluminum tubes and cured for 24 hours at 140° C. as described in Example 8. The cured castings possess the properties shown in the following table:

| Experiment | Impact bending strength, cm. kg./cm.² | Bending strength, kg./mm.² | Thermal stability according to Martens DIN in ° C. |
| --- | --- | --- | --- |
| 1 | 5.8 | 7.0 | 177 |
| 2 | 9.5 | 8.0 | 171 |
| 3 | 9.6 | 8.9 | 174 |
| 4 | 7.1 | 13.0 | 171 |

EXAMPLE 12

30 parts of the cycloaliphatic polyepoxide compound (resin C) used in Example 11, containing 6.28 equivalents of epoxide groups per kg. are mixed at a slightly raised temperature (about 40–50° C.) with 70 parts of a monoepoxide compound prepared as described in Example 1 which contains 4.7 equivalents of epoxide groups per kg. The mixture has a viscosity of 10,000 cp. at 25° C.

0.65 equivalent of phthalic anhydride per equivalent of epoxide groups is fused in as curing agent at 120–125° C.

The resulting mixture is cast in aluminum tubes and cured for 24 hours at 140° C. as described in Example 8. The cured castings possess the following properties:

Impact bending strength _____ 8.3 cm./kg./cm.².
Thermal stability according to
  Martens DIN _____ 145°
Bending strength _____ 10.6 kg./mm.².

What we claim is:
1. A monoepoxide of the formula

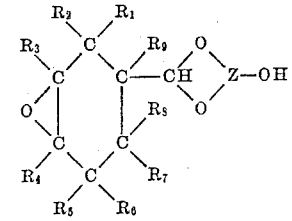

wherein $R_1$ and $R_5$ are selected from the group consisting of hydrogen, halogen, lower alkyl and together $R_1$ and $R_5$ form the methylene group, $R_2$, $R_3$, $R_4$, $R_6$, $R_7$, $R_8$ and $R_9$ each represent a member selected from the class consisting of hydrogen, halogen and lower alkyl, and Z represents the hydrocarbon radical of a trihydric alcohol.

2. The monoepoxide of the formula

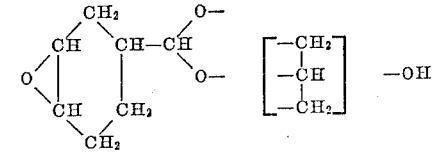

3. The monoepoxide of the formula

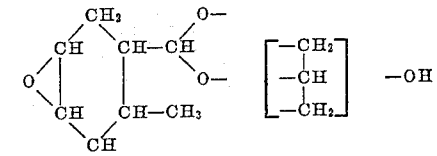

References Cited in the file of this patent

UNITED STATES PATENTS 2,729,650    Habeshaw et al. _____ Jan. 3, 1956
2,895,962    Fisher _____ July 21, 1959